United States Patent
Iio et al.

(10) Patent No.: US 6,891,986 B2
(45) Date of Patent: May 10, 2005

(54) OPTICAL SWITCH

(75) Inventors: Shinji Iio, Musashino (JP); Masayuki Suehiro, Musashino (JP); Shin-ichi Nakajima, Musashino (JP); Yoshiyuki Asano, Musashino (JP); Akira Miura, Musashino (JP); Tsuyoshi Yakihara, Musashino (JP); Shinji Kobayashi, Musashino (JP); Sadaharu Oka, Musashino (JP); Morio Wada, Musashino (JP); Shoujirou Araki, Musashino (JP); Machio Dobashi, Musashino (JP); Chie Sato, Musashino (JP); Yasukazu Akasaka, Musashino (JP)

(73) Assignee: Yokogawa Electric Corp., Tokyo (JP)

( * ) Notice: Subject to any disclaimer, the term of this patent is extended or adjusted under 35 U.S.C. 154(b) by 3 days.

(21) Appl. No.: 10/763,277

(22) Filed: Jan. 26, 2004

(65) Prior Publication Data

US 2004/0184712 A1 Sep. 23, 2004

(30) Foreign Application Priority Data

Mar. 18, 2003 (JP) .................................... 2003-073495
Aug. 13, 2003 (JP) .................................... 2003-292762

(51) Int. Cl.⁷ ................................................. G02B 6/12
(52) U.S. Cl. .............................. 385/14; 385/15; 385/16; 385/40; 385/129; 385/131; 385/41; 385/39
(58) Field of Search .............................. 385/14, 39, 40, 385/42, 129, 130, 131, 132, 15, 16, 17, 18, 41

(56) References Cited

U.S. PATENT DOCUMENTS 4,737,003 A * 4/1988 Matsumura et al. .......... 385/18
4,784,451 A * 11/1988 Nakamura et al. ........... 385/18
5,107,514 A * 4/1992 Goto ............................ 372/46
6,633,692 B2 * 10/2003 Chua et al. ................... 385/16

FOREIGN PATENT DOCUMENTS

| JP | 4-320219 | 11/1992 |
| JP | 5-249508 | 9/1993 |
| JP | 6-59294 | 3/1994 |
| JP | 6-62450 | 3/1994 |
| JP | 6-130236 | 5/1994 |
| JP | 6-289339 | 10/1994 |
| JP | 8-82810 | 3/1996 |

OTHER PUBLICATIONS

"2x2 Optical Waveguide Switch with Bow–Tie Electrode Based on Carrier–Injection Total Internal Reflection in SiGe Alloy," Baojun Li and Soo–Jin Chua, pp. 206–208, IEEE Photonics Technology Letters, vol. 13, No. 3, Mar. 2001.
Baojun Li, Guozheng Li, Enke Liu, Zuimin Jiang, Chengwen Pei and Xun Wang, Appl. Phys. Lett., pp. 1–3, 75 (1999).
K. Ishida, H. Nakamura, H. Matsumura, T. Kadi, and H. Inoue, Appl. Phys. Lett., pp. 141–142, 50(3), 19 (1987).

* cited by examiner

Primary Examiner—Brian M. Healy
(74) Attorney, Agent, or Firm—Westerman, Hattori, Daniels & Adrian, LLP

(57) ABSTRACT

In an optical switch, a carrier-accumulating layer in which injected carriers are accumulated is provided on a semiconductor substrate having a waveguide formed thereon so that injected effective carriers tend to be accumulated in an effective part, and the burden on a driving circuit is thus reduced to realize high-speed operation. At the same time, when a clad on the carrier injection side, of clad layers formed on both sides of the waveguide, is a second clad layer, and a clad on the substrate side is a first clad layer, a third clad layer is formed on the first clad layer to reduce propagation loss in the waveguide.

13 Claims, 6 Drawing Sheets

Index distribution

Intensity distribution

OPTICAL SWITCH

BACKGROUND OF THE INVENTION

1. Field of the Invention

This invention relates to an optical switch for switching the transmission path of an optical signal in accordance with a change in refractive index due to carrier injection, and particularly to an optical switch that enables reduction in injected current by having such a structure that injected effective carriers tend to be accumulated in an part where they will be effective, and constricting the current injection region to improve the efficiency.

2. Description of the Related Art

The present communication networks such as LAN and WAN (Wide Area Network) usually employ a communication system of transmitting information through electric signals.

A communication method of transmitting information through optical signals is only used in trunk networks for transmitting a large quantity of data and some other networks. Further, these networks use point-to-point communication and have not reached a level of communication network that can be called "photonic network".

To realize such a photonic network, devices such as an optical router and an optical switching hub are necessary that have the same functions as a router, a switching hub and the like for switching destinations of electric signals.

These devices need an optical switch for switching the transmission path at a high speed. There are optical switches using ferroelectrics such as lithium niobate and PLZT (lead lanthanum zirconate titanate), or an optical switch in which a waveguide is formed on a semiconductor and carriers are injected into the semiconductor to change the refractive index and thus switch the transmission path of an optical signal.

The following are literature of prior arts related to the conventional optical switch in which a waveguide is formed on a semiconductor and carriers are injected into the semiconductor to change the refractive index and thus switch the transmission path of an optical signal.

Patent Reference 1: JP-A-04-320219
Patent Reference 2: JP-A-05-249508
Patent Reference 3: JP-A-06-059294
Patent Reference 4: JP-A-06-062450
Patent Reference 5: JP-A-06-130236
Patent Reference 6: JP-A-06-289339
Patent Reference 7: JP-A-08-082810

Non-Patent Reference 1: "2×2 Optical Waveguide Switch with Bow-Tie Electrode Based on Carrier-Injection Total Internal Reflection in SiGe Alloy," Baojun Li and Soo-Jin Chua, p.206–p.208, IEEE PHOTONICS TECHNOLOGY LETTERS, VOL.13, NO.3, MARCH 2001

Non-Patent Reference 2: Baujun Li, Guozheng Li, Enke Liu, Zuimin Jiang, Chengwen Pei and Xun Wang, Appl. Phys. Lett., pp.1–3, 75 (1999)

Non-Patent Reference 3: K. Ishida, H. Nakamura, H. Matsumura, T. Kadi, and H. Inoue, Appl. Phys. Lett., pp.141–142, 50(3), 19(1987)

FIG. 1 is a plan view showing an example of a conventional optical switch. FIG. 2 is a sectional view along a line A–A' in FIG. 1.

In FIG. 1, a waveguide layer 2 having an X-shaped waveguide is formed on a substrate 1, and a rectangular N-electrode 3 is formed at the intersecting part of the X-shape.

Near the intersecting part of the X-shaped waveguide, a rectangular P-electrode 4 is formed parallel to the N electrode 3.

FIG. 2 is a sectional view along the line A–A' in FIG. 1. In FIG. 2, a p-SiGe layer 2a having the X-shaped waveguide is formed on the p-Si substrate 1. Electrons are injected into the N-electrode 3, and holes are injected into the P-electrode 4. In this example, the carrier injection is carried out by causing a forward current to flow to an Si PN diode formed by an $n^+$ layer formed below the N-electrode 3 and a $p^+$ layer formed below the P-electrode 4.

The operation in the conventional example shown in FIG. 1 will now be described with reference to FIG. 1. When the optical switch is off, no current is supplied to the N electrode 3 and the P-electrode 4.

Since the refractive index at the intersecting part of the X-shaped waveguide 2 does not change, for example, an optical signal entering from the part "PI01" in FIG. 1 travels straight through the intersecting part and is emitted from the part "PO01" in FIG. 1.

On the other hand, when the optical switch is on, electrons are injected from the N electrode 3 and holes are injected from the P-electrode 4. As a result, the carriers (electrons and holes) are injected into the intersecting part.

Since the refractive index at the intersecting part of the X-shaped waveguide is changed to be lower because of a plasma effect, for example, an optical signal entering from the point "PI01" in FIG. 1 is totally reflected by the part of low refractive index generated in the intersecting part and is emitted from the part "PO02" in FIG. 1.

As a result, by supplying a current to the electrodes, thus injecting carriers (electrons and holes) into the intersecting part of the X-shaped waveguide and controlling the refractive index at the intersecting part, it is possible to control the position where an optical signal is emitted, that is, to switch the propagation path of the optical signal.

Meanwhile, the carrier-injected optical switch can make the operation easier by decreasing driving current and thus reducing the burden on the driving circuit.

In this example, carrier injection is carried out by causing a forward current to flow to an Si PN diode. In such a structure, injected carriers are not accumulated in an intermediate part and easily flow out to the opposite electrode. Therefore, a very large current must be supplied. This causes a large burden on the driving circuit and also makes high-speed operation difficult.

That is, as injected carriers are not accumulated in an intermediate part and easily flow out to the opposite electrode, a very large current must be supplied for the operation, causing problems of a large burden on the driving circuit and difficulty in high-speed operation.

FIGS. 3 and 4 show another conventional example of an optical switch. FIG. 3 is a plan view. FIG. 4 is a sectional view along a line A–A' in FIG. 3.

In FIGS. 3 and 4, a first clad layer 20 formed by an n-InP layer, an X-shaped waveguide 21 comprising an n-InGaAsP layer, a second clad layer 22 comprising an n-InP layer and a contact layer 23 comprising an n-InGaAsP layer are stacked on a semiconductor substrate 1a made of InP.

An insulation layer 24 made of $SiO_2$ or the like is formed over the entire surface except for the intersecting part of the X-shaped waveguide 2b (see FIG. 3), and a first electrode 25 is formed at the intersecting part.

In FIG. 4, at a part indicated by "A" in the second clad layer, right below the P-electrode 25, and parts indicated by "B" and "C" in the parts of the first clad layer except for the part right below the P-electrode, Zn, which is p-type impurity, is diffused in to form a current narrowing structure.

That is, in the structure of this example, the p regions are provided in the waveguide 21 of the switch part to narrow the current, and the region of a high carrier concentration is regulated to limit the region where the refractive index changes. On the rear side of the InP substrate 1a, an N electrode 26 is formed.

The operation in the conventional example shown in FIGS. 3 and 4 will now be described. When the optical switch is off, no current is supplied to the first electrode 25 and the electrode on the rear side of the substrate 1a.

Since the refractive index at the intersecting part of the X-shaped waveguide 2b does not change, for example, an optical signal entering from part Pi in FIG. 3 travels straight through the intersecting part and is emitted from part P1.

On the other hand, when the optical switch is on, a current is supplied from the first electrode 25 to the electrode 26 on the rear side of the substrate 1a, and carriers (electrons and holes) are injected into the intersecting part.

As a result, since the refractive index at the intersecting part of the X-shaped waveguide 2b directly below electrode 25 is changed to be lower because of a plasma effect, for example, an optical signal entering from the point "Pi" is totally reflected by the part of low refractive index generated in the intersecting part and is emitted from a part indicated by "P2".

As a result, by supplying a current to the electrodes, carriers (electrons and holes) are injected into the intersecting part of the X-shaped waveguide 2b and thus the refractive index at the intersecting part is controlled, and it is possible to switch the propagation path of the optical signal.

However, in the conventional example shown in FIGS. 3 and 4, as the p regions for current narrowing are provided right below the InGaAsP layer, which is an optical confinement layer of the waveguide part, the light propagating through the waveguide spreads to the p regions having a high carrier concentration, and free carrier absorption occurs. This causes a problem of increase in propagation loss of the waveguide.

SUMMARY OF THE INVENTION

It is an object of this invention to provide a waveguide-type optical switch having a such a structure that injected effective carriers tend to be accumulated in a part where they will be effective, reducing the burden on the driving circuit to realize high-speed operation, and having a current narrowing structure, in which propagation loss of the waveguide is reduced.

According to this invention, there is provided an optical switch for switching a transmission path of a waveguide in accordance with a change in refractive index made by carrier injection, wherein a carrier-accumulating layer where the injected carriers are accumulated is provided on a substrate upon which the waveguide is formed, thus causing injected effective carriers to be easily accumulated in an effective part, reducing the burden on the driving circuit and realizing high-speed operation, and wherein of the clad layers formed on both sides of the waveguide, when the clad on the carrier injection side is a second clad layer and the clad on the substrate side is a first clad layer, a third clad layer is formed on the first clad layer, thus reducing propagation loss of the waveguide.

DETAILED DESCRIPTION OF THE PREFERRED EMBODIMENTS

Figure 1:
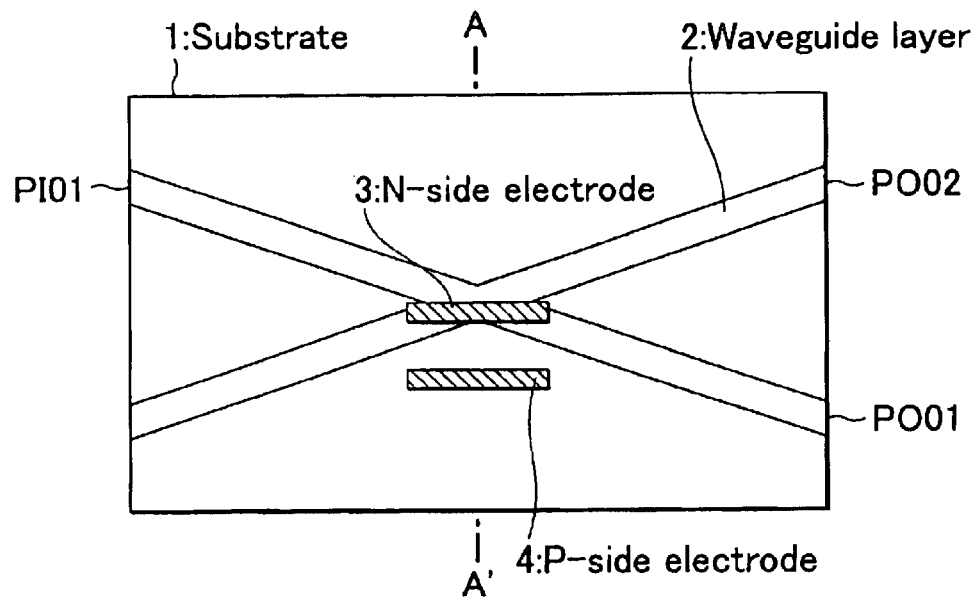
FIG. 1 is a plan view showing an example of a conventional optical switch.
Figure 2:
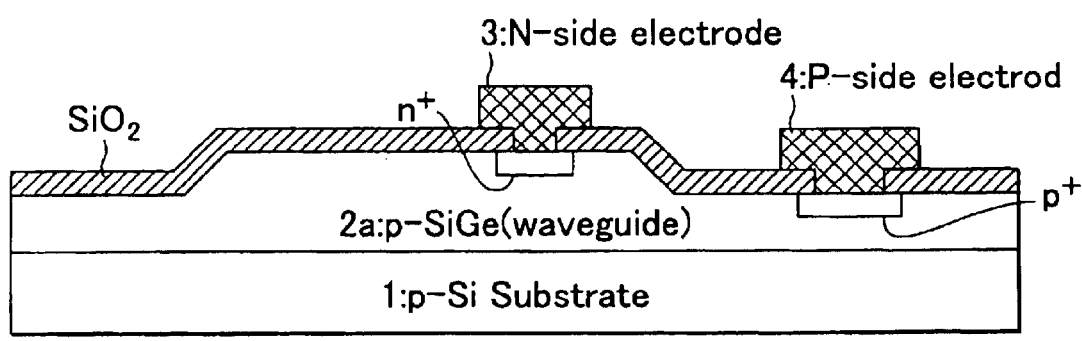
FIG. 2 is a sectional view along a line A–A' in FIG. 1.
Figure 5:
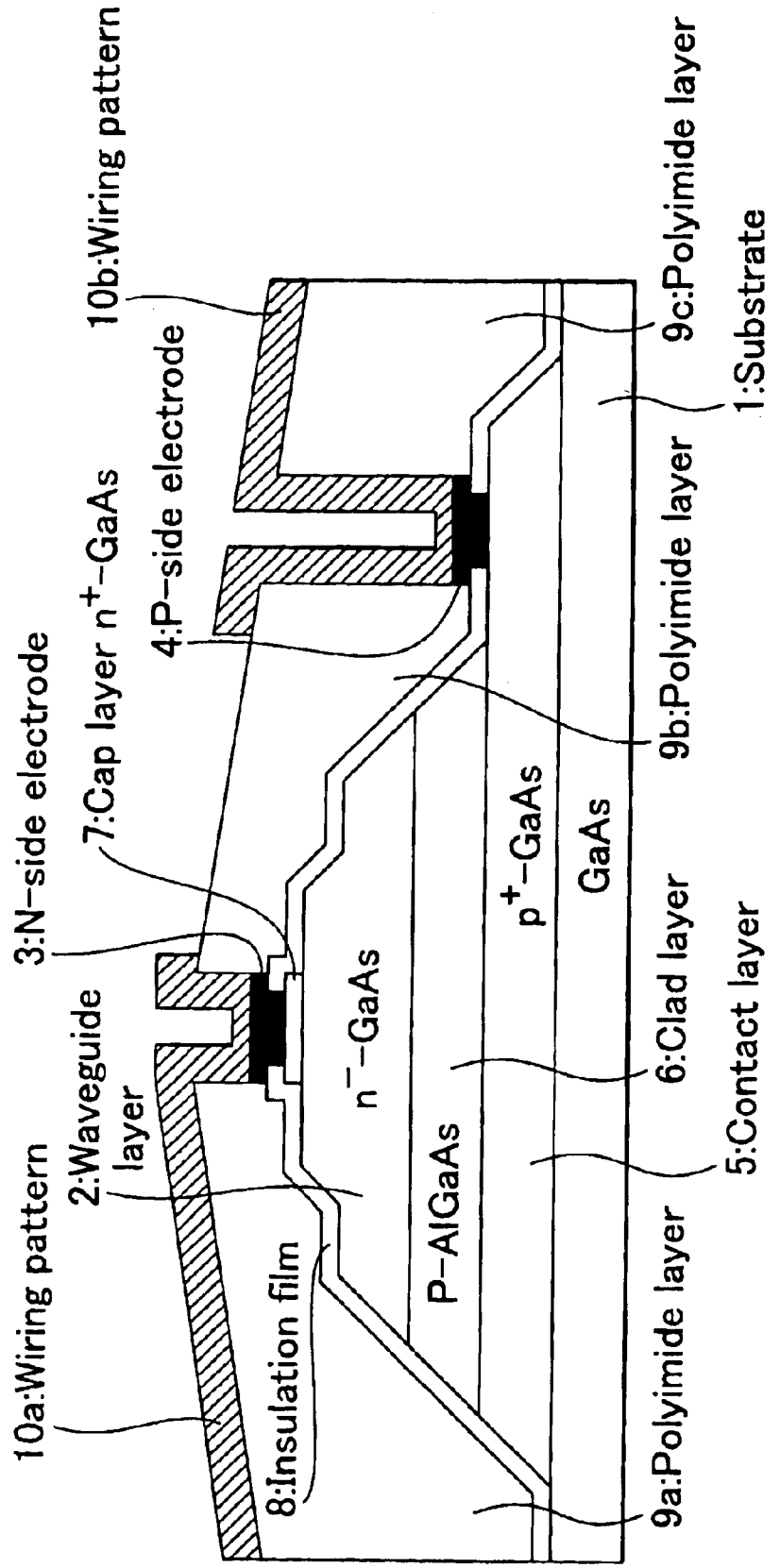
FIG. 5 is a sectional view showing an embodiment of an optical switch according to this invention.
Figure 6:
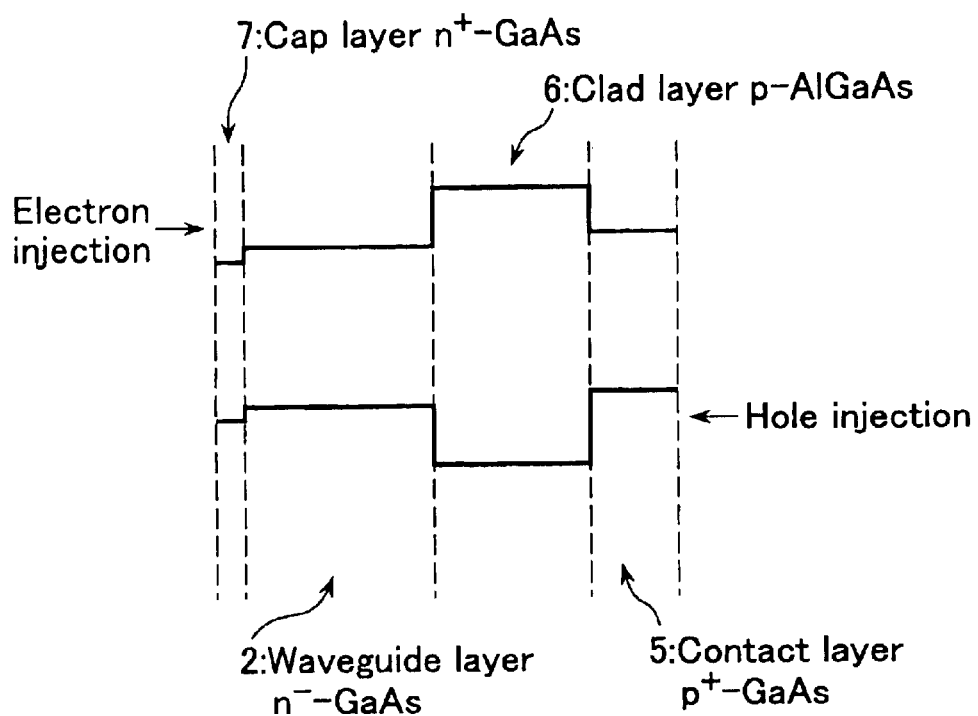
FIG. 6 is a schematic diagram showing band structure at the time of current injection in the optical switch shown in FIG. 5.

Hereinafter, this invention will be described in detail with reference to the drawings. FIG. 5 is a sectional view showing an embodiment of an optical switch according to this invention. FIG. 6 is a schematic diagram showing a band structure at the time of current injection in the optical switch shown in FIG. 5. The plan view of this optical switch is the same as the conventional example of FIG. 1 and therefore will not be shown and described here.

In FIG. 5, on a semiconductor substrate 1 of GaAs, InP or the like, a waveguide layer 2 made of $n^-$-GaAs and having an X-shaped waveguide is formed, and an N-electrode 3 to which electrons are injected and a P-electrode 4 to which holes are injected are formed.

Also on the substrate 1, a contact layer 5 made of $p^+$-GaAs, a clad layer 6 made of p-AlGaAs, a cap layer 7 of $n^+$-GaAs, an insulation film 8 of $SiO_2$ or the like, polyimide layers 9a, 9b and 9c, which are insulation layers, and wiring patterns 10a and 10b are formed.

The contact layer 5, the clad layer 6 and the waveguide layer 2 are sequentially formed into a trapezoidal shape. The cap layer 7 is formed on a part of the waveguide layer 2.

The insulation film 8 is formed on the substrate 1, the contact layer 5, the clad layer 6 and the waveguide layer 2, except for a part of the cap layer 7 and a part of the contact layer 5.

Moreover, N-electrode 3 and the P-electrode 4 are formed on a part of the cap layer 7 and a part of the contact layer 5, respectively.

The polyimide layers 9a, 9b and 9c are formed on the insulation film 8. The wiring pattern 10a is formed on the polyimide layer 9a and is connected to the N-electrode 3. The wiring pattern 10b is formed on the polyimide layer 9c and is connected to the P-electrode 4.

FIG. 6 shows a schematic diagram of a band structure at the time of current injection in the optical switch shown in FIG. 5.

In the carrier injection-type optical switch, the refractive index of the semiconductor is changed by injecting carriers, and the path of light is thus switched. The quantity of change in refractive index differs largely, depending on the type of carriers.

The quantity of change in refractive index is inversely proportional to the effective mass of carriers. Therefore, the smaller the effective mass of carriers is, the larger the change in refractive index corresponding to the carrier change is. In an ordinary semiconductor, since electrons have a smaller effective mass than holes, a change in refractive index in the case of injecting electrons is larger than a change in refractive index in the case of injecting holes.

In the waveguide layer, only a change in refractive index has effect on path switching. That is, by injecting carriers and thus causing electrons to be easily accumulated in the waveguide, it is possible to reduce the driving current of the optical switch.

In the optical switch having the band structure shown in FIG. 6, the waveguide layer 2 is of an n-type having a relatively low concentration ($10^{17}/cm^3$ or less), and the clad layer 6 is of a p-type having a medium concentration (approximately $10^{16}$ to $5 \times 10^{18}/cm^3$). Holes are injected into the n⁻-GaAs waveguide layer from the lower p⁺-GaAs contact layer through the p-AlGaAs clad layer.

On the other hand, electrons are injected into the n⁻GaAs waveguide layer 2 from the n⁺-GaAs cap layer 7. In this case, though the electrons are injected into the waveguide layer, the clad layer 6, because it is a p-type AlGaAs layer, becomes a large barrier against the electrons, and the electrons tend to be accumulated in the waveguide layer 2.

The carrier injection-type optical switch as described above has such a structure that electrons, which cause a relatively large change in refractive index with change in concentration, tend to be accumulated in the waveguide layer. Therefore, the driving current of the optical switch can be lowered and the burden on the driving circuit can be reduced.

Although an AlGaAs-based semiconductor is used in the embodiment, other semiconductor materials having similar effects such as SiGe-based, InGa(Al)AsP-based and GaInNAs-based semiconductors may be used.

While a contact layer is provided on the lower side and the cap layer is provided on the upper side in this embodiment, instead of providing the contact layer, a contact region may be formed in the clad layer by ion implantation or impurity diffusion.

Also, instead of providing the cap layer, a contact region may be formed in the waveguide layer by ion implantation or impurity diffusion.

Moreover, if the waveguide layer is formed to have a narrower band gap than that of the clad layer and to have different polarity (p/n), the accumulation effect of electrons increases when the waveguide layer is made n-type, and the accumulation effect of holes increases when the waveguide layer is made p-type.

If a semiconductor layer having a broader band gap than the waveguide layer is provided on the waveguide layer and is formed by a layer of different polarity, the accumulation effect of electrons increases when the waveguide layer is made n-type, and the accumulation effect of holes increases when the waveguide layer is made p-type.

Figure 7:
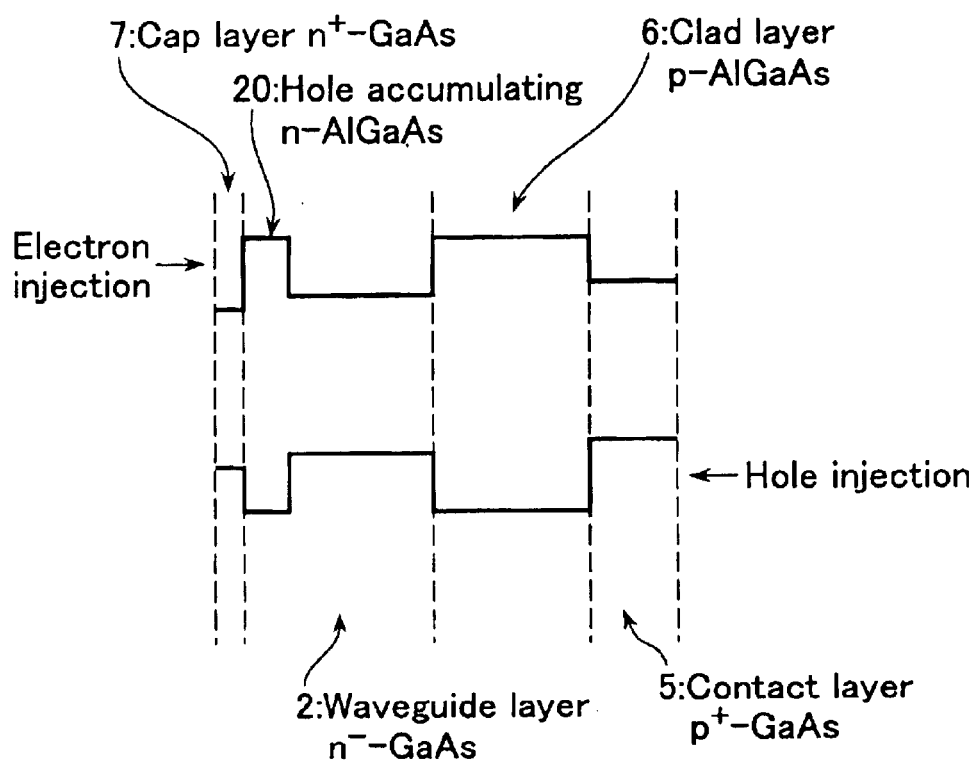
FIG. 7 is a schematic diagram showing another band structure at the time of current injection in the embodiment.

Moreover, though a single hetero structure is used in this embodiment in which the waveguide layer and the clad layer are semiconductor layers having different band gaps and are in contact with each other, if a double hetero structure is used in which a hole-accumulating layer 20, having reverse polarity to that of the clad layer 6 below the waveguide layer 2, is provided between the cap layer 7 and the waveguide layer 2 as shown in FIG. 7, both electrons and holes can be accumulated in the waveguide layer and the driving current can be reduced further.

While a ridge type is used for optical confinement in the lateral direction of the waveguide in this embodiment, the proposed effect does not depend on the optical confinement method in the lateral direction of the waveguide.

Figure 8:
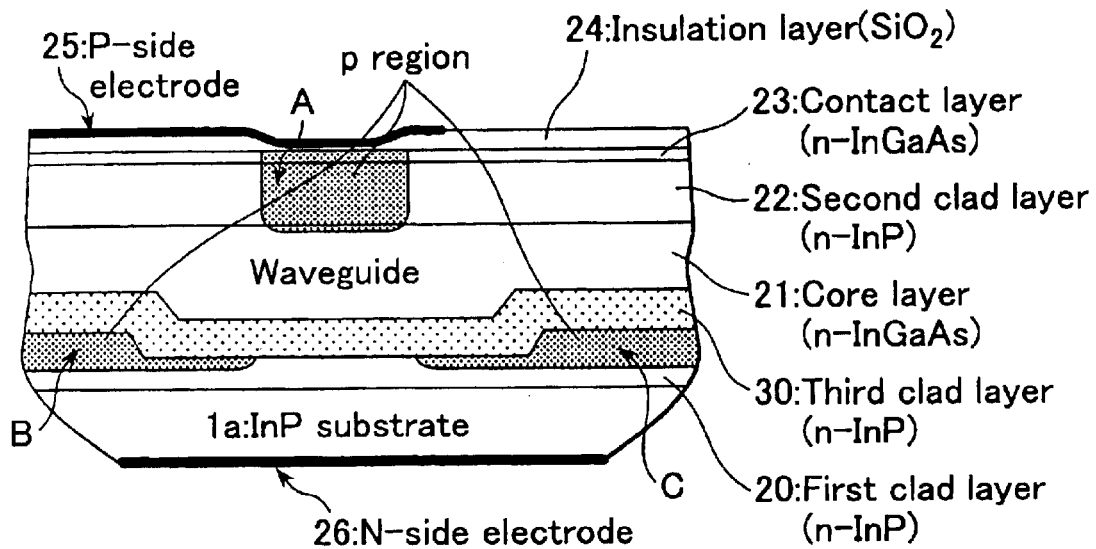
FIG. 8 is a sectional view showing another embodiment of the optical switch according to this invention.

FIG. 8 is a sectional view showing another embodiment of the optical switch according to this invention. The plan view of this optical switch is the same as the conventional example of FIG. 1 and therefore will not be described here.

In FIG. 8, on a semiconductor substrate 1a made of InP, a first clad layer 20 formed by an n-InP layer, an X-shaped waveguide 21 formed by an n-InGaAsP layer, a second clad layer 22 formed by an n-InP layer and a contact layer 23 formed by an n-InGaAsP layer are sequentially stacked.

An insulation layer 24 of $SiO_2$ or the like is formed on these layers except for the intersecting part of the X-shaped waveguide 2b (see FIG. 3), and a P-electrode 25 is formed at the intersecting part.

In FIG. 8, in part A in the second clad layer right below the P-electrode and parts B and C extending over the first clad layer except for a part right below the P-electrode, Zn, which is p-type impurity, is diffused to form a current narrowing structure. A third clad layer 30 is formed on the first clad layer containing these p-type impurity regions B and C. The third clad layer 30 has a thickness of approximately 0.5 to 1 μm and has a low carrier concentration, for example on the order of approximately $10^{16}$ cm⁻³, so as to reduce free carrier absorption. With such a carrier concentration, propagation loss of the waveguide can be reduced.

That is, in the structure of this embodiment, the p regions are provided in the waveguide of the switch part to narrow the current, and the region of a high carrier concentration is regulated to limit the region where the refractive index changes.

In this embodiment, the first clad layer is made into a recessed shape to form the waveguide. On the rear side of the InP substrate 1a, an N-electrode 26 is formed.

The operation of the optical switch of this invention shown in FIG. 8 will now be described.

When the optical switch is off, no current is supplied to the P-electrode 25 and the electrode on the rear side of the substrate 1a.

Figure 3:
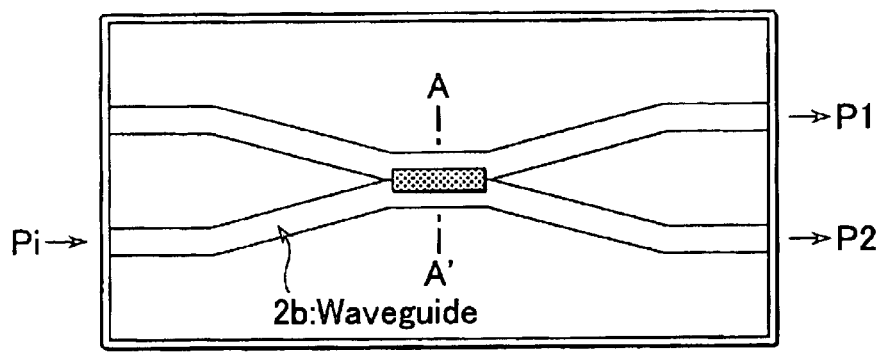
FIG. 3 is a plan view showing another conventional example of an optical switch.
Figure 4:
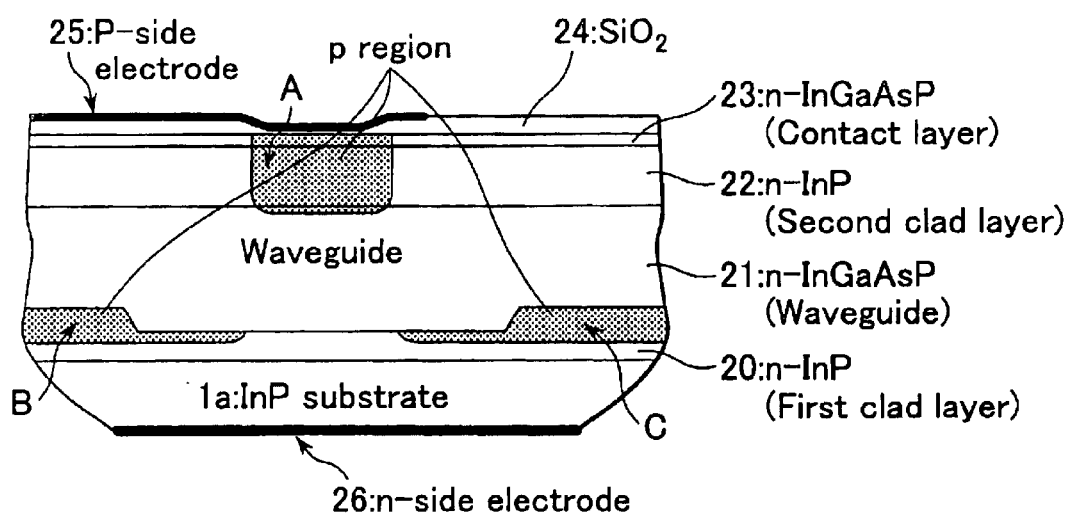
FIG. 4 is a sectional view along a line A–A' in FIG. 3.

Since the refractive index at the intersecting part of the X-shaped waveguide 2b (see FIG. 3) does not change, for example, an optical signal entering from a part "Pi" in FIG. 3 travels straight through the intersecting part and is emitted from a part indicated by "P1".

On the other hand, when the optical switch is on, a current is supplied from the P-electrode 25 to the electrode 26 on the rear side of the substrate 1a, and carriers (electrons and holes) are injected into the intersecting part.

Since the refractive index at the intersecting part of the X-shaped waveguide 2b (FIG. 3) right below the electrode 25 is changed to be lower because of a plasma effect, for example, an optical signal entering from the point "Pi" is totally reflected by the part of low refractive index generated in the intersecting part and is emitted from a part indicated by "P2".

As a result, by supplying a current to the electrodes, injecting carriers (electrons and holes) into the intersecting part of the X-shaped waveguide 2b and thus controlling the refractive index at the intersecting part, it is possible to switch the propagation path of the optical signal.

Therefore, as in the conventional example shown in FIG. 3, the optical signal entering from the part "Pi" is totally reflected by the part of low refractive index generated in the intersecting part of the X-shaped waveguide 2b and is emitted from the part "P2" in FIG. 3.

Figure 9:
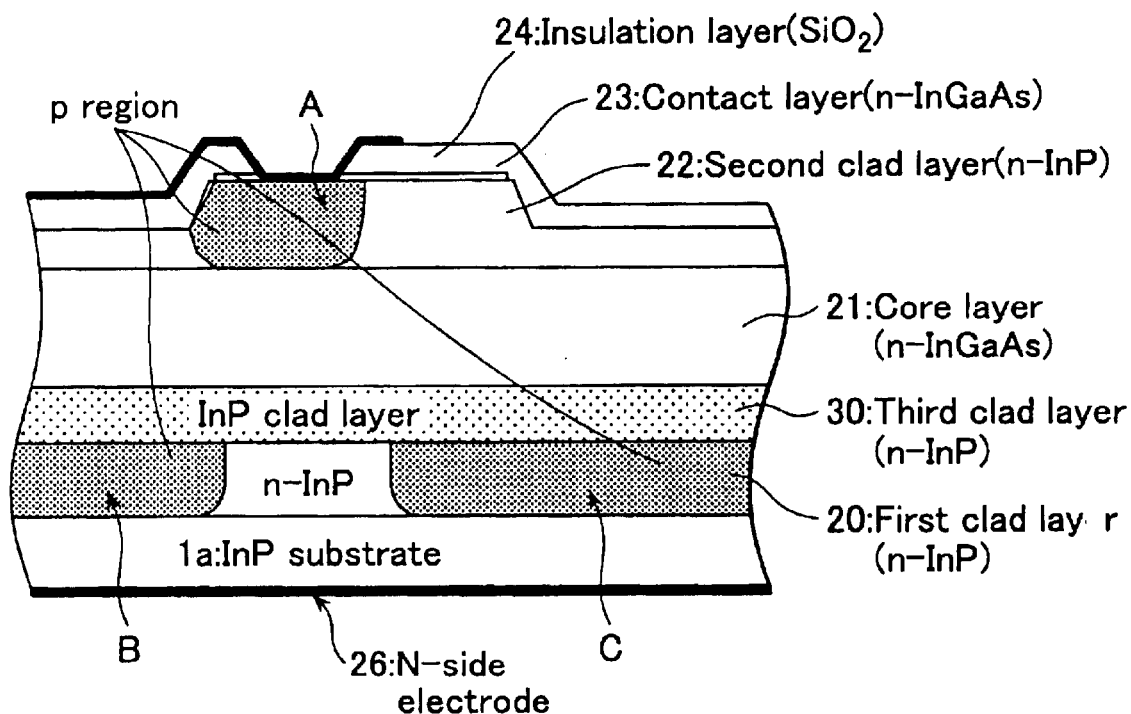
FIG. 9 is a sectional view showing still another embodiment of the optical switch according to this invention.

FIG. 9 shows still another embodiment. In this embodiment, a second clad layer 22 is etched thinner to form a slab waveguide. In this embodiment, a first clad layer is not processed in a recessed shape and the second clad layer 22 is etched thinner to form the slab waveguide. This structure enables realization of an optical switch of a simple structure that can be easily produced. The other parts of the structure are similar to those shown in FIG. 8 and therefore will not be described further in detail.

Figure 10:
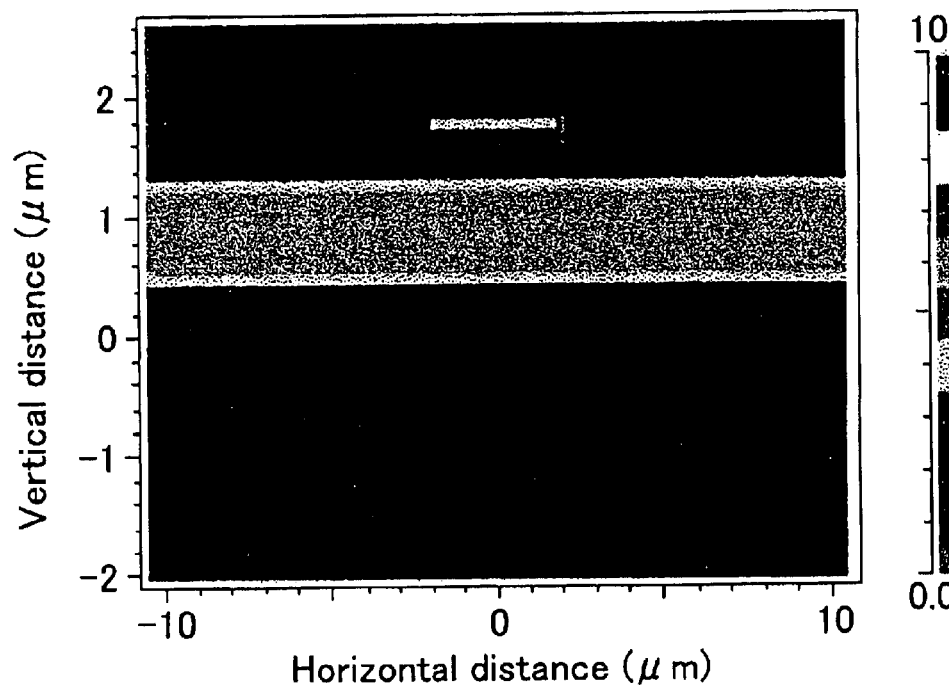
FIG. 10 is an explanatory view showing an example result of simulation of index distribution.
Figure 11:
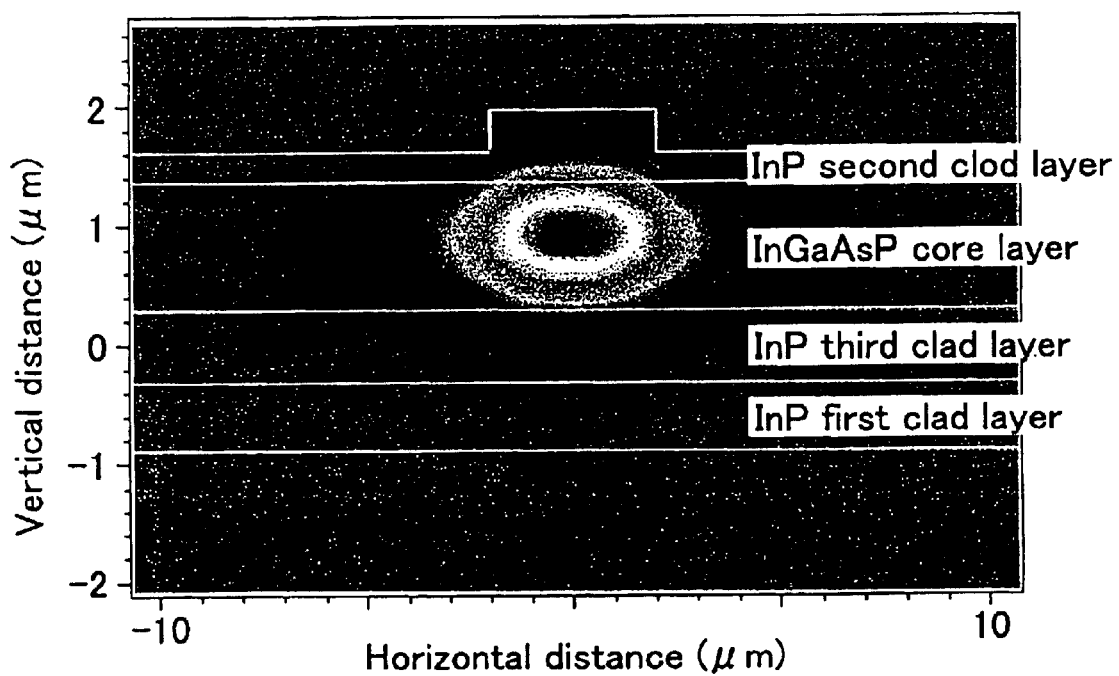
FIG. 11 is an explanatory view showing an example result of simulation of light intensity distribution.

FIGS. 10 and 11 show the results of calculating the light intensity distribution in a propagation mode of the slab waveguide structure (with index distribution expressed by relative value) in the embodiment of this invention shown in FIG. 9. As seen from the light intensity distribution shown in FIGS. 10 and 11, the propagation mode is a single ($0^{th}$ order) mode, and because the third clad layer 30 is provided, the light intensity is extremely small in the first clad layer 20 having the current narrowing structure (p regions). Therefore, it can be seen that the influence of the provision of the current narrowing structure (p regions) on free carrier absorption can be reduced.

The above-described embodiments of this invention are simply specific preferred embodiment described for the purpose of explanation and illustration. Therefore, it is clear to those skilled in the art that various changes and modifications can be made without departing from the scope of this invention.

The scope of this invention defined by the appended claims includes changes and modifications within that scope.

As described above, according to the embodiment shown in FIGS. 5 to 7, in an optical switch for switching the transmission path in a waveguide in accordance with change in refractive index due to carrier injection, a carrier-accumulating layer where the injected carriers are accumulated is provided on a substrate having the waveguide formed thereon so that injected effective carriers tend to be accumulated in a part where they will be effective. Therefore, the burden on a driving circuit is reduced and high-speed operation can be realized.

Since the waveguide layer is made of an n-type semiconductor, the accumulation effect of electrons, which cause a larger change in refractive index than holes, can be increased.

Moreover, since the waveguide layer is formed by a semiconductor layer having a narrower band gap than that of a clad layer and having a different polarity, the accumulation effect of electrons can be increased when the waveguide layer is made n-type and the accumulation effect of holes can be increased when the waveguide layer is made p-type.

According to the embodiment shown in FIGS. 8 and 9, an optical switch for switching the transmission path of an optical signal in accordance with a change in refractive index due to carrier injection has a first clad layer formed on a semiconductor substrate, a waveguide layer formed on the first clad layer in which the optical signal enters from one side, the optical path splits into two at an intermediate part, and the signal is emitted, a second clad layer formed on the waveguide layer, a contact layer formed on the second clad layer, an oxide layer formed on the first clad layer on the contact layer except for a part thereof, a first electrode formed in the part on the contact layer where the oxide layer is not formed, a second electrode formed on the rear side of the substrate, and an impurity diffusion region for current narrowing in the second clad layer right below the first electrode and in all parts of the first clad layer except for a part right below the first electrode. A third clad layer is formed on the first clad layer. As a result, an optical switch with reduced propagation loss of waveguide can be realized.

What is claimed is:

1. An optical switch for switching a transmission path in a waveguide in accordance with a change in refractive index made by carrier injection, wherein a carrier-accumulating layer in which the injected carriers are accumulated is provided on a semiconductor substrate having the waveguide formed thereon.

2. The optical switch as claimed in claim 1, wherein a clad layer and a waveguide layer are stacked on the semiconductor substrate, and the clad layer has a band gap broader than that of the waveguide layer, thereby causing the waveguide layer to be the carrier-accumulating layer.

3. The optical switch as claimed in claim 1 or 2, wherein a semiconductor layer having a broader band gap than that of a waveguide layer is provided on the waveguide layer.

4. The optical switch as claimed in claim 3, wherein the semiconductor layer having a broader band gap than that of the waveguide layer is formed by a layer having different p/n polarity.

5. The optical switch as claimed in claim 1 or 2, wherein the waveguide layer is made of an n-type semiconductor.

6. The optical switch as claimed in claim 2, wherein the waveguide layer is formed by a semiconductor layer having a narrower band gap than that of the clad layer and is formed by a layer having a different polarity.

7. The optical switch as claimed in claim 1 or 2, wherein on a semi-insulating GaAs substrate, p-AlGaAs is stacked as a clad layer, and n-AlGaAs having a lower Al content ratio (including 0) than the clad layer is stacked as a waveguide layer.

8. The optical switch as claimed in claim 1 or 2, wherein a SiGe-based material is used as a semiconductor material.

9. The optical switch as claimed in claim 1 or 2, wherein an InGa(Al)AsP-based material is used as a semiconductor material.

10. The optical switch as claimed in claim 1 or 2, wherein a GaInNAs-based material is used as a semiconductor material.

11. An optical switch for switching a transmission path of an optical signal in accordance with a change in refractive index due to carrier injection, comprising:
   a first clad layer formed on a semiconductor substrate;
   a waveguide layer formed on the first clad layer and having a waveguide formed therein in which the optical signal enters from one side, the optical path splits into two at an intermediate part, and the signal is emitted;
   a second clad layer formed on the waveguide layer;
   a contact layer formed on the second clad layer;
   an oxide layer formed thereon on the first clad layer and on the contact layer except for a part thereof;
   a first electrode formed on the part on the contact layer where the oxide layer is not formed;
   a second electrode formed on the rear side of the substrate; and
   an impurity diffusion region for current narrowing in the second clad layer right below the first electrode and in all parts of the first clad layer except for the part right below the first electrode;
   wherein a third clad layer is formed on the first clad layer.

12. The optical switch as claimed in claim 11, wherein the waveguide is made of a slab type.

13. The optical switch as claimed in claim 11 or 12, wherein the third clad layer is formed with such a low carrier concentration that free carrier absorption does not occur.

* * * * *